3,379,660
ALKENE OXIDE POLYMERIZATION WITH A CATALYST COMPRISING AN ORGANOALUMINUM COMPOUND, AN ORGANOZINC COMPOUND AND WATER
Henry L. Hsieh, Bartlesville, Okla., assignor to Phillips Petroleum Company, a corporation of Delaware
No Drawing. Filed June 7, 1965, Ser. No. 462,104
4 Claims. (Cl. 260—2)

ABSTRACT OF THE DISCLOSURE

Alkene oxide compounds are polymerized with a catalyst system comprising (a) an organoaluminum compound, (b) an organozinc compound, and (c) water. The rubbery polymers, so produced, are useful in the automobile industry for fabricating hoses, tubing, and the like.

---

This invention relates to alkene oxide polymerization. In one aspect, this invention relates to processes of polymerizing epoxides. In another aspect, this invention relates to catalyst systems for polymerizing alkene oxides.

A variety of different processes and catalysts for polymerizing alkene oxides is described in the patent art and in the technical literature. The polymers produced by these processes range in consistency from low molecular weight liquids to high molecular weight waxy solids. One such process involves the use of a catalyst comprising an organoaluminum compound such as a trialkylaluminum compound in admixture with water. The polymer produced by this catalyst is a low molecular weight liquid which can be used as a pigment vehicle in the paint industry. Another catalyst which has been used for polymerizing alkene oxides comprises an organozinc compound such as diethylzinc in admixture with water. Although this catalyst results in the formation of a polymer which is a high molecular weight solid, relatively large quantities of the organozinc compound are required to effect polymerization. The comparatively high cost of this catalyst component renders it economically unattractive and impractical for large-scale use. Another shortcoming associated with the organozinc-water catalyst systems of the prior art is extreme sensitivity of the catalyst to the water level. If the water level with this catalyst system fluctuates either above or below the optimum level used to promote polymer formation, the activity of the catalyst decreases considerably.

According to this invention, these and other disadvantages of the prior art processes of polymerizing alkene oxides are overcome by providing a novel catalyst system comprising an organoaluminum compound, an organozinc compound, and water. The alkene oxide polymers produced by means of the catalyst of this invention are high molecular weight rubbers. The polymerization process is more efficient when using the catalyst system of this invention because a higher monomer conversion is achieved. Further, the organozinc compound is less sensitive to the water level when it is employed with the organoaluminum compound than when it is employed alone. The organoaluminum compound of the catalyst can be any organoaluminum compound such as a triorganoaluminum compound, an organoaluminum monohydride, organoaluminum monohalide, organoaluminum dihydride, organoaluminum dihalide, and an organoaluminum sesquihalide. The organozinc compound of the catalyst can be any diorganozinc compound, organozinc monohalide, or organozinc monohydride. These compounds can be prepared by a variety of different processes well known in the art.

Accordingly, it is an object of this invention to provide an improved process for polymerizing alkene oxides.

Another object of this invention is to provide a novel catalyst for polymerizing alkene oxides.

A further object of this invention is to provide a process of polymerizing alkene oxides which results in the production of a rubbery polymer having good flexibility.

Still another object of this invention is to provide a process of polymerizing alkene oxides which results in the formation of a polymer product which is sulfur vulcanizable.

A still further object of this invention is to provide a process of polymerizing alkene oxides wherein the monomer conversion is much higher than the monomer conversion by the processes of the prior art.

These and other objects of the invention will become apparent to one skilled in the art after studying the following detailed description and the appended claims.

The organoaluminum-organozinc-water catalyst of this invention can be used for polymerizing any saturated or unsaturated alkene oxide to form a rubbery polymer having good flexibility. The catalyst can be used for polymerizing alkene oxides containing up to and including 20 carbon atoms per molecule. The catalyst of this invention is particularly useful in the polymerization of alkene oxide monomers containing from about 2 to about 8 carbon atoms. Thus, alkene oxides which can be polymerized in accordance with this invention can be represented by the formula

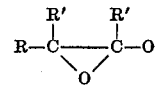

wherein R and R' are selected from the group consisting of hydrogen, saturated aliphatic, saturated cycloaliphatic, monoolefinic aliphatic, diolefinic aliphatic (conjugated and non-conjugated), monoolefinic cycloaliphatic, diolefinic cycloaliphatic (conjugated and non-conjugated), and aromatic radicals and combinations of these such as aralkyl, alkaryl, and the like. Some or all of the R and R' radicals can be halogen-substituted, and can contain oxygen in the form of an acyclic ether linkage (—O—) or an oxirane group

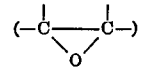

Further, the alkene oxides represented by the above formula can contain 1 or 2 olefinic linkages, 1 or 2 oxirane groups, and up to 1 ether linkage. In addition, both R' variables can represent a divalent aliphatic hydrocarbon radical which, together with the carbon atoms of the oxirane group, can form a cycloaliphatic hydrocarbon nucleus containing from about 4 to about 10 carbon atoms and preferably from about 4 to about 8 carbon atoms.

Specific examples of some of the alkene oxides which are within the above structural formula and which can be homopolymerized or copolymerized in accordance with this invention are ethylene oxide (epoxyethane); 1,2-epoxypropane (propylene oxide); 1,2-epoxybutane; 2,3-epoxybutane; 1,2-epoxypentane; 2,3-epoxypentane; 1,2-epoxyhexane; 3,4-epoxyhexane; 1,2-epoxyheptane; 2,3-epoxyoctane; 2,3-dimethyl-2,3-epoxypentane; 1,2-epoxy-4-methylpentane; 2,3-epoxy-5-methylhexane; 1,2-epoxy-4,4-dimethylpentane; 4,5-epoxyeicosane; 1-chloro-2,3-epoxypropane (epichlorohydrin); 1-bromo-2,3-epoxypropane; 1,5-dichloro-2,3-epoxypentane; 2-iodo-3,4-epoxybutane; styrene oxide; 6-oxobicyclo[3.1.0]hexane; 7-oxabicyclo[4.1.0]heptane; 3-propyl-7-oxabicyclo[4.1.0]heptane; bis(2,3-epoxypropyl)ether; tert-butyl 4,5-epoxyhexyl ether; and 2-phenylethyl 3,4-epoxybutyl ether.

Unsaturated alkene oxides within the above structural formula, including ethers, which can be homopolymerized or copolymerized with the saturated alkene oxides include allyl 2,3-epoxypropyl ether (allyl glycidyl ether); allyl 3,4-epoxybutyl ether; 1-methallyl 3,4-epoxyhexyl ether; 3-hexenyl 5,6-epoxyhexyl ether; 2,6-octadienyl 2,3,7,8-diepoxyoctyl ether; 6-phenyl-3-hexenyl 3-ethyl-5,6-epoxyhexyl ether; 3,4-epoxy-1-butene (butadiene monoxide); 3,4-epoxy-1-pentene; 5-phenyl-3,4-epoxy-1-pentene; 1,2,9,10-diepoxy-5-decene; 6,7 - di - n - butyl-3,4,9,10-diepoxy-1,11-dodecadiene; epoxy vinyl ether; allyl 2-methyl-2,3-epoxypropyl ether; 3-cyclohexyl-2-propenyl 4-cyclohexyl-3,4 - epoxybutyl ether; 2,4 - pentadienyl 2,3 - diethyl-3,4-epoxybutyl ether; 1-methallyl 6-phenyl - 3,4 - epoyyhexyl ether; 5-(4-tolyl)2,3-epoxypentyl vinyl ether; bis[4-(3-cyclopentenyl)2,3-epoxybutyl]ether; 2-(2,4-cyclohexadienyl)ethyl 2,3-epoxybutyl ether; 2-(2,5-cyclohexadienyl) ethyl 2-benzhyl-4,5-epoxypentyl ether; 3,4-epoxy-1,5-hexadienyl isopropyl ether; allyl 3,4-dimethyl-3,4-epoxyhexyl ether; 3,4-epoxy-4-(2,3-dimethylphenyl)1-butene; 3,4-dimethyl-3,4-epoxy-1-pentene; 5 - (4-methylcyclohexyl)3,4-epoxy-1-pentene; 4,5 - diethyl-4,5-epoxy-2,6-octadiene; 4-(2,4 - cyclopentadienyl)1,2,6,7 - diepoxyheptane; and 1-phenyl-1,2-epoxy-5,7-octadiene.

The novel catalyst of this invention comprises an organoaluminum compound, an organozinc compound, and water. Since the catalyst preparation forms no part of this invention, and since it can be admixed and brought into contact with the alkene oxide monomers in a variety of different ways, it is obvious that the catalyst preparation and polymerization technique employed is within the knowledge and preference of one skilled in the art. Thus, the catalyst components can be admixed and introduced into a reaction zone whereupon they contact the alkene oxide monomers or the catalyst components can be introduced from separate sources into the reaction zone during polymerization.

The organoaluminum portion of the catalyst can be represented by the formula $$R''_nAlX_m$$

wherein $R''$ is a hydrocarbon radical selected from the group consisting of saturated aliphatic, saturated cycloaliphatic, and aromatic containing from 1 to 20 carbon atoms, inclusive, and combinations such as aralkyl, alkaryl, and the like; X is a member of the class consisting of hydrogen, fluorine, chlorine, bromine, and iodine; n is an integer of from 1 to 3, inclusive; m is an integer of from 0 to 2, inclusive; and the sum of the integers n and m equals 3. Organoaluminum compounds within the above formula include triorganoaluminum compounds, organoaluminum monohalides, organoaluminum monohydrides, organoaluminum dihalides, organoaluminum dihydrides, and organoaluminum sesquihalides. The organoaluminum sesquihalides as herein defined are intended to mean a mixture of organoaluminum monohalides and organoaluminum dihalides of the formulas $R''_2AlX$ and $R''AlX_2$, respectively, wherein $R''$ is the same as hereinbefore defined with respect to the general formula and X is a halogen. The organoaluminum sesquihalides can then be written as $R''_3Al_2X_3$ or as $R''_{1\,1/2}AlX_{1\,1/2}$. Exemplary organoaluminum compounds within the above formula include trimethylaluminum, triethylaluminum, tri-n-butylaluminum, triisobutylaluminum, tri - n - hexylaluminum, tri-n-decylaluminum, tri-n-eicosylaluminum, tricyclohexylaluminum, triphenylaluminum, methyldiphenylaluminum, ethylbis(3,5-di-n-heptylphenyl)aluminum, tribenzylaluminum, tri-1-naphthylaluminum, di-n-octylphenylaluminum, tri-4-tolylaluminum, dimethylchloroaluminum, methyldichloroaluminum, n - heptyldifluoroaluminum, (3-ethylcyclopentyl)diiodoaluminum, methylisobutylchloroaluminum, diphenylbromoaluminum, dibenzylchloroaluminum, di-n-octylchloroaluminum, n-octylphenylchloroaluminum, di - n - eicosyliodoaluminum, n - butyldihydroaluminum, methyldihydroaluminum, diisopropylhydroaluminum, ethylmethylhydroaluminum, diphenylhydroaluminum, benzyl-n-dodecylhydroaluminum, dicyclohexylhydroaluminum, 2,6-di-n-butyl-4-n-hexylphenyldihydroaluminum, and n-amylethylhydroaluminum.

The organozinc portion of the catalyst system can be represented by the formula $$R'''_tZnY_u$$

wherein $R'''$ is a hydrocarbon radical selected from the group consisting of saturated aliphatic, saturated cycloaliphatic, and aromatic containing from 1 to 20 carbon atoms, inclusive, and combinations such as aralkyl, alkaryl, and the like; Y is a member of the class consisting of hydrogen, fluorine, chlorine, bromie, and iodine; t is an integer of from 1 to 2, inclusive; u is an integer from 0 to 1, inclusive; and the sum of the integers t and u equals 2. Organozinc compounds within the above formula include diorganozinc compounds, organozinc monohalides, and organozinc monohydrides. Exemplary organozinc compounds within the above general formula include dimethylzinc; diethylzinc; di - n - propylzinc; diisopropylzinc; di-n-butylzinc; diisobutylzinc; di-n-amylzinc; di-n-hexylzinc; di-n-octylzinc; di-n-dodecylzinc; dicyclopentylzinc; dicyclohexylzinc; bis(2,5-dimethylcyclopentyl)zinc; bis(3,5-dimethylcyclohexyl)zinc; diphenylzinc; bis(2-n-hexyltetradecyl)zinc; bis(4-cyclohexyloctyl)zinc; bis(2-n-butylcyclohexyl)zinc; bis(2,4,8 - trimethylhendecyl)zinc; bis(7 - n - pentyltetradecyl)zinc; bis[2-(2,3,5 - tri-n-butyl phenyl)ethyl]zinc; dibenzylzinc; bis(4,6-dicyclopentyldecyl)zinc; methylethylzinc; ethylisopropylzinc; n-propyl-n-hexylzinc; methylchlorozinc; ethylbromozinc; n-propylchlorozinc; n-amylbromozinc; n-hexyliodozinc; n-octylchlorozinc; cyclopentylchlorozinc; cyclohexylbromozinc; 2-n-hexyltetradecylchlorozinc; 7-n-pentyltetradecylbromozinc; benzylbromozinc; 4,6-disyclopentyldecylbromozinc; n-dodecylfluorozinc; 3,5-methylcyclohexylchlorozinc; cyclohexyliodozinc; methylhydrozinc; cyclohexylhydrozinc; n-eicosylhydrozinc; 4-tolylhydrozinc; and n-amylhydrozinc.

It is obviously within the spirit and scope of this invention to employ two or more organozinc compounds and two or more organoaluminum compounds at the same time to form the catalyst. Similarly, two or more organozinc compounds can be used with one organoaluminum compound or two or more organoaluminum compounds can be used with one organozinc compound to form the catalyst of this invention.

The water used as the third component in the novel catalyst of this invention cooperates with the other components in the catalyst to produce high molecular weight rubber polymers. Although it is not known for certain just how the water functions, the data shows that when water is employed high molecular weight rubbery polymers are produced in the practice of this invention.

The amount of catalyst used for effecting polymerization of the alkene oxides can be varied over a rather broad range. The catalyst level which is desired is for convenience based on the sum total of the organoaluminum and organozinc compounds. Generally, the total amount of organoaluminum compound and organozinc compound present can be within the range of about 1 to about 100 gram millimoles per 100 grams of alkene oxide, with the preferred range being about 5 to about 40 gram millimoles per 100 grams of alkene oxide.

The mole ratio of the organoaluminum compound to the organozinc compound in the catalyst is within the range of about 0.1:1 to about 9:1 and preferably within the range of about 0.7:1 to about 2.5:1.

The amount of water used in the catalyst is based upon the total amount of organoaluminum and organozinc compounds present. The mole ratio of the total organoaluminum and organozinc compounds to the water can be within the range of about 0.3:1 to about 3:1 and preferably within the range of about 0.65:1 to about 1.5:1.

The alkene oxide polymerization reaction of this invention can be carried out either as a batch process or as a continuous process with the novel catalyst system being added in a single initial charge or in predetermined increments during polymerization. Similarly, the monomers may be introduced into the reaction zone in one charge or they may be added gradually during polymerization. In order to expedite and improve the efficiency of the polymerization reaction, it is generally preferred that the reaction be carried out in the presence of an inert diluent. Suitable diluents which can be used for this purpose include paraffinic, cycloparaffinic, and aromatic hydrocarbons containing from about 4 to about 10 carbon atoms per molecule. Exemplary diluents which can be used are butane, pentane, hexane, decane, cyclopentane, cyclohexane, methylcyclohexane, benzene, toluene, xylene, ethylbenzene, and the like. It is also within the spirit and scope of this invention to employ halogenated hydrocarbons such as chlorobenzene and the like as diluents. Since the actual diluent employed is largely a matter of choice, it is obviously possible to employ other diluents than those herein identified without departing from the spirit and scope of the invention. Mixtures of suitable compounds can also be employed as diluents.

The temperature and pressure at which the polymerization process of this invention is effected can vary over a rather wide range. Generally, the polymerization is conducted at a temperature within the range of about 40 to about 250° F. and preferably within the range of about 85 to about 200° F. Polymerization is usually conducted at a pressure which will maintain the materials in the liquid state. It is obvious that the reaction can be conducted at superatmospheric pressures of several thousand pounds if desired.

The duration of the polymerization reaction will depend primarily upon temperature, pressure, and catalyst activity. Usually, the process will be conducted for a period of a few minutes or less to about 100 hours or more. A preferred range is about 10 minutes to about 50 hours.

The alkene oxide polymers and copolymers produced in accordance with the catalyst system of this invention exhibit extremely good low temperature flexibility. The polymers and copolymers are particularly resistant to the effects of heat and to the effects of ozone. The alkene oxide polymers have unlimited utility in the automobile industry for fabricating articles such as motor mounts, body mounts, suspension system parts, hoses, tubing, and the like.

The following example will serve to illustrate the catalyst system of this invention. It is to be understood that this example is for the purpose of illustration only and that many variations and modifications can be made from the example without departing from the concept of the invention.

SPECIFIC EXAMPLE

A series of runs was conducted whereby propylene oxide was polymerized by means of the catalyst system of this invention and by means of catalysts of the prior art in order to illustrate the improved and unexpected result obtained by this invention. The catalyst system of this invention comprised triisobutylaluminum, dibutylzinc, and water. The ratio of the total organoaluminum and organozinc compounds to water was varied to illustrate the improved result obtained by the invention with various proportions of the components. The materials were charged to a reactor in the following proportions:

| | |
|---|---|
| Propylene oxide, parts by weight | 100 |
| Toluene, parts by weight | 860 |
| Triisobutylaluminum (TBA), mhm [1] | Variable |
| Dibutylzinc (Bu₂Zn), mhm [1] | Variable |
| Water, mhm [1] | Variable |
| Temperature, °F. | 158 |
| Time, hours | 20 |

[1] Gram millimoles per 100 grams monomer.

The actual polymerization technique employed involved the steps of charging the reactor with toluene and thereafter purging it with nitrogen. The organoaluminum compound was then charged to the reactor followed by the organozinc compound, the water, and the propylene oxide monomer. The reaction was allowed to continue for the time indicated and at the conclusion of each run approximately 2 parts by weight of 2,2'-methylene-bis (4-methyl-6-tert-butylphenol) antioxidant was added per 100 parts of monomer. The reaction mixture from each run was then poured into water which had previously been acidified with hydrochloric acid. The reactor was rinsed with acetone in order to remove any polymer solution that may have remained. The reaction mixture in the acidified water separated into an aqueous phase and an organic phase. The organic phase was removed and washed with water to remove any catalyst residues. The polymer was recovered from the organic phase by evaporating the diluent. This polymer product was then dried under vacuum. Table I below illustrates the results of each of the runs and the properties of each of the polymers produced.

TABLE I

| Run No. | TBA (mhm.) | Bu₂Zn (mhm.) | Water (mhm.) | TBA+Bu₂Zn:H₂O (mole ratio) | Monomer Conversion (Percent) | Inherent Viscosity |
|---|---|---|---|---|---|---|
| 1 | 30 | 0 | 25 | 1.2:1 | 46 | 0.94 |
| 2 | 25 | 5 | 25 | 1.2:1 | 59 | 3.6 |
| 3 | 20 | 10 | 25 | 1.2:1 | 56 | 5.1 |
| 4 | 15 | 15 | 25 | 1.2:1 | 84 | 5.7 |
| 5 | 0 | 30 | 25 | 1.2:1 | 43 | 5.2 |
| 6 | 30 | 0 | 30 | 1:1 | 28 | 0.8 |
| 7 | 25 | 5 | 30 | 1:1 | 70 | 3.2 |
| 8 | 20 | 10 | 30 | 1:1 | 90 | 3.9 |
| 9 | 15 | 15 | 30 | 1:1 | 96 | 5.1 |
| 10 | 0 | 30 | 30 | 1:1 | 50 | 4.4 |
| 11 | 30 | 0 | 35 | 0.86:1 | 18 | |
| 12 | 25 | 5 | 35 | 0.86:1 | 60 | 5.4 |
| 13 | 20 | 10 | 35 | 0.86:1 | 97 | 4.0 |
| 14 | 15 | 15 | 35 | 0.86:1 | 68 | 2.4 |
| 15 | 0 | 30 | 35 | 0.86:1 | 0 | |

In order to determine the inherent viscosity, one-tenth gram of polymer was placed in a wire cage made from 80-mesh screen and the cage was placed in 100 ml. of toluene contained in a wide-mouth, 4-ounce bottle. After standing at room temperature (approximately 77° F.) for about 24 hours, the cage was removed and the solution filtered through a sulfur absorption tube of Grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity was calculated by dividing the natural logarithm of the relative viscosity by the weight of the soluble portion of the original sample.

It can be seen from the data in Runs 2, 3, 4, 7, 8, 9, 12, 13, and 14 that the catalyst of this invention provides an improved process over that obtained with the catalyst of the prior art as evidenced by a comparison with the data reported in Runs 1, 5, 6, 10, 11, and 15. It should be noted that in Runs 1, 6, and 11, using the prior art catalyst of triisobutylaluminum and water, the monomer conversions and the inherent viscosities of the polymers produced were low. The monomer conversion was also low in Runs 5, 10, and 15 using the prior art catalyst of dibutylzinc and water. In all of the runs using the catalyst comprising the organoaluminum compound, the organozinc compound, and the water, the monomer conversions were much higher than in the runs using either the organoaluminum compound and water or in the runs using the organozinc compound and water.

As hereinbefore indicated, any unsaturated alkene oxide can be homopolymerized or copolymerized to form a rubbery polymer which can be sulfur vulcanized. In the copolymerization of 1,2-epoxypropane and an unsaturated alkene oxide, it is preferred to employ allyl 2,3-epoxypropyl ether (allyl glycidyl ether) as the unsaturated monomer. In the copolymerization of two unsaturated alkene oxides, it is generally preferred to form a copolymer of allyl 2,3-expoxypropyl ether (allyl glycidyl ether) and 3,4-epoxy-1-butene (butadiene monoxide). These copolymers can be sulfur vulcanized with ease because the polymer chains contain a multiplicity of olefinic bonds. Polymerization conditions and techniques for copolymerizing two or more alkene oxides are generally the same as in the homopolymerization of alkene oxides. Thus, factors such as catalyst level, temperature, pressure, and the like in the homopolymerization reaction can be employed in a like manner in the copolymerization reaction.

Although the invention has been described in considerable detail, it must be understood that such detail is for the purpose of illustration only and that many variations and modifications can be made by one skilled in the art without departing from the spirit and scope of the invention.

I claim:

1. A process of polymerizing at least one alkene oxide of the formula

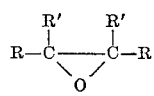

wherein R and R' are selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted radicals of the foregoing type, and combinations thereof, and said radicals can contain oxygen in the form of an acyclic ether linkage (—O—) or an oxirane group

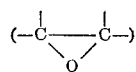

and said alkene oxide can contain 1 or 2 olefinic linkages, 1 or 2 oxirane groups, and 1 ether linkage, and both R' variables in said alkene oxide can represent a divalent aliphatic hydrocarbon radical which together with the oxirane group in said alkene oxide can form a cycloaliphatic nucleus, said process comprising contacting said alkene oxide with a catalyst comprising:

(a) an organoaluminum compound of the formula

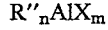

wherein R'' is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals 3;

(b) an organozinc compound of the formula

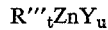

wherein R''' is a hydrocarbon radical selected from the group consisting of saturated aliphatic, saturated cycloaliphatic, and aromatic containing from 1 to 20 carbon atoms, inclusive; Y is a member of the class consisting of hydrogen, fluorine, chlorine, bromine, and iodine; $t$ is an integer of from 1 to 2, inclusive; $u$ is an integer of from 0 to 1, inclusive; and the sum of the integers $t$ and $u$ equals 2; and (c) water, wherein the mol ratio of said organoaluminum compound to said organozinc compound is within the range of about 01:1 to 9:1; wherein the total amount of said organoaluminum compound and said organozinc compound present is within the range of about 1 to about 100 gram millimoles per 100 grams of said alkene oxide; and wherein the mol ratio of the total organoaluminum and organozinc compounds to water is within the range of about 0.3:1 to about 3:1.

2. A process according to claim 1 wherein said alkene oxide is 1,2-epoxypropane; wherein said organoaluminum compound is triisobutylaluminum; and wherein said organozinc compound is dibutylzinc.

3. The process according to claim 1 wherein said contacting is at a temperature in the range of about 40° to about 250° F.

4. The process according to claim 1 wherein said alkene oxide is 1,2-epoxypropane.

References Cited

UNITED STATES PATENTS 3,135,705   6/1964   Vandenberg _____ 260—2

FOREIGN PATENTS 623,510   1/1963   Belgium.

OTHER REFERENCES

J. Polymer Sci., vol. 47, issue 149 (1960), pp. 486–488 relied on.

T. PERTILLA, *Assistant Examiner.*

WILLIAM H. SHORT, *Primary Examiner.*

UNITED STATES PATENT OFFICE
CERTIFICATE OF CORRECTION

Patent No. 3,379,660                                April 23, 1968

Henry L. Hsieh

It is hereby certified that error appears in the above numbered patent requiring correction and that the said Letters Patent should read as corrected below.

Column 8, line 37, beginning with "2. A process" cancel all to and including "dibutylzinc." in line 40, same column 8, and insert > 2. The process according to claim 1 wherein said alkene oxide is 1,2-epoxypropane.

same column 8, line 44, beginning with "4. The process" cancel all to and including "1,2-epoxypropane." in line 45, same column 8, and insert > 4. A process according to claim 3 wherein said alkene oxide is 1,2-epoxypropane; wherein said organoaluminum compound is triisobutylaluminum, and wherein said organozinc compound is dibutylzinc.

Signed and sealed this 11th day of November 1969.

(SEAL)
Attest:

EDWARD M. FLETCHER, JR.                      WILLIAM E. SCHUYLER, JR.
Attesting Officer                                Commissioner of Patents